United States Patent
Marceau et al.

(10) Patent No.: US 7,272,854 B2
(45) Date of Patent: Sep. 18, 2007

(54) ALIASING TO PREVENT ATTACKS ON MESSAGING SERVICES

(75) Inventors: Carla Marceau, Ithaca, NY (US); Kevin S. Millikin, Eden Prairie, MN (US); Ranga S. Ramanujan, Eden Prairie, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 830 days.

(21) Appl. No.: 10/610,514

(22) Filed: Jun. 30, 2003

(65) Prior Publication Data

US 2005/0010753 A1    Jan. 13, 2005

(51) Int. Cl.
*H04L 29/00*    (2006.01)
(52) U.S. Cl. ..................................... 726/22
(58) Field of Classification Search ............... 705/74; 713/158

See application file for complete search history.

(56) References Cited

U.S. PATENT DOCUMENTS

| | | | |
|---|---|---|---|
| 6,088,804 A * | 7/2000 | Hill et al. ............... | 726/25 |
| 6,427,164 B1 * | 7/2002 | Reilly ..................... | 709/206 |
| 6,591,291 B1 * | 7/2003 | Gabber et al. .......... | 709/206 |
| 6,665,304 B2 * | 12/2003 | Beck et al. ............. | 370/401 |
| 6,836,805 B1 * | 12/2004 | Cook ...................... | 709/245 |
| 7,047,303 B2 * | 5/2006 | Lingafelt et al. ....... | 709/229 |
| 7,096,254 B2 * | 8/2006 | Awada et al. .......... | 709/206 |
| 2003/0110212 A1 * | 6/2003 | Lewis .................... | 709/203 |

OTHER PUBLICATIONS

Mazieres et al., "The Design, Implementation and Operation of an Email Pseudonym Server", 1998, ACM, pp. 27-36.*

* cited by examiner

*Primary Examiner*—Matthew B Smithers
(74) *Attorney, Agent, or Firm*—Shumaker & Sieffert P.A.

(57) ABSTRACT

In general, the invention is directed to techniques for preventing or otherwise reducing the effects of network attacks, such as Denial of Service (DoS) attacks, on applications that use messaging services. In particular, the invention may be effective for publish/subscribe messaging services and queuing messaging services. The techniques utilize destination aliasing, a form of channel partitioning, in which each messaging service client associated with a messaging service is assigned a unique alias for each topic that the messaging service client requests service. The aliases may be used for monitoring traffic originating from particular clients, defending applications from network attacks, and preventing resumption of an attack by an attacking client.

37 Claims, 4 Drawing Sheets

| CLIENT IDENTITY | DESTINATION ALIAS | TOPIC |
| --- | --- | --- |
| 1 | T1 | T |
| 2 | T2 | T |
| 3 | T3 | T |
| 4 | T4 | T |
| 5 | A5 | A |
| 6 | A6 | A |
| 7 | C7 | C |
| 8 | C8 | C |
| ... | ... | ... |

FIG. 3

ALIASING TO PREVENT ATTACKS ON MESSAGING SERVICES

STATEMENT REGARDING FEDERALLY SPONSORED RESEARCH OR DEVELOPMENT

This invention was made with Government support under Contract N66001-00-C-8055awarded by SPAWAR Systems Center. The Government may have certain rights in this invention.

TECHNICAL FIELD

The invention relates to computer networks and, more particularly, to improving resistance to computer network attacks.

BACKGROUND

Messaging services, such as message queuing and publish/subscribe systems, are becoming more prevalent as consumers look for easier ways for members of groups to share information with one another. Messaging services allow users to send platform-independent messages, so senders and receivers are not required to share host architecture, operating system, or programming language. Messaging services also enable looser coupling of applications than the traditional client/server model of interaction and easily accommodate delays and transient failures. Finally, messaging services provide support for features such as transactions, priority, acknowledgements, and other practical requirements of industrial-strength applications.

Two common forms of messaging services are message queuing and publish/subscribe messaging services. Both message queuing and publish/subscribe messaging services include client applications that attempt to send or receive messages. In particular, the client attempts to send messages to a "message destination." In queuing systems, the destination is called a "message queue." The queuing system allows a buffer to store incoming information until a client is able to retrieve the information. In message queuing services, each client has a corresponding message queue and the messages of the message queue are delivered to the corresponding clients.

In publish/subscribe services, the message destination is sometimes referred to as a "topic." A topic server stores published items for a variety of topics, and forwards the publications to subscribers when the publications are published. A message published to a topic is broadcast to all clients that have subscribed to that topic. There may be a single central server or a plurality of distributed servers that use point-to-point networking for publish/subscribe messaging services. Clients associated with a topic may be identified via a username and password, a digital signature, digital certificate, or other digital credential. Identification is required for both access to topics and the establishment of a connection.

In a typical publish/subscribe service, a client interested in publishing or subscribing to a particular topic submits a topic request to a directory service. If the request is granted, the directory service issues a topic to which the client can publish or subscribe via a service provider.

Unfortunately, some of the characteristics of messaging services offer attackers the same sort of opportunities as email and the Web: common protocols and software whose weaknesses can be discovered and exploited. In particular, the attacker can use a well-publicized interface to gain access to a desired destination. The destination, sometimes referred to as a target application, may be targeted by a number of different types of attacks.

As one example, Denial-of-Service (DoS) attacks pose a significant threat to messaging-based applications. A client may attack a service provider, either maliciously or inadvertently, by flooding the service provider with requests. For example, for publish/subscribe messaging services, one or more clients may send more publish requests to a service provider than the service provider may be able to handle. If the service provider is being attacked, it may fail to properly send or receive messages. This can be disastrous if the information in the messages is critical. A malicious client may also attack an application without attacking the service provider. In particular, the client may flood a particular topic with messages until an application is unable to cope with the flood. The inability of the application to cope with the flood may disable the topic, even though the service provider may still be able to handle the message traffic.

SUMMARY

In general, the invention is directed to techniques for preventing or otherwise reducing the effects of network attacks, such as Denial of Service (DoS) attacks, on applications that use messaging services. The invention may be especially effective for publish/subscribe messaging services. The techniques described herein utilize destination aliasing, a form of channel partitioning, in which each messaging service client is assigned a unique alias for each topic that the messaging service client requests. The aliases may be used for monitoring traffic originating from or directed to particular clients, defending applications from network attacks, and preventing resumption of an attack by an attacking client.

The destination aliases may include information about the client identity and the topic for which the client requests service. In other words, the destination aliases may be associated with the source and destination of a topic request. In particular, the topic request includes a client identification to specify the source of the request, and destination information that specifies the topic that is being requested. Various parameters of the network traffic associated with a destination alias may be monitored to identify network attacks. For example, a network attack may be signaled when the traffic associated with a particular destination alias exceeds a threshold.

To defend against the attack to the destination alias, any further messages to that destination alias may be automatically discarded. Messages sent to other destination aliases for the same topic are not affected, so legitimate traffic may continue. To prevent resumption of the attack, the attacking client may be restricted from obtaining any further destination aliases. In addition, other servers may be warned of the attacking client so they can choose to block communication with the client.

In one embodiment, the invention is directed to a method including maintaining a mapping of destination aliases to topic destinations of a messaging service, wherein each destination alias is uniquely associated with a messaging service client, selecting one of the destination aliases from the destination aliases in response to a network attack, and discarding messages associated with the selected destination alias. In addition, the method may include receiving aliasing information from a directory service that specifies a new messaging service client and associated network alias, and updating the mapping based on the received aliasing information.

In another embodiment, the invention is directed to a method including receiving a request from a messaging service client to access a topic destination, accessing a collection of data to determine whether the messaging service client has previously been associated with a network attack, and assigning the messaging service client a unique destination alias for accessing the topic destination based on the determination.

In another embodiment, the invention is directed to a system comprising a directory service that provides an operating environment for a topic factory corresponding to messaging service, wherein in response to a request from a messaging service client the topic factory generates a corresponding destination alias for the messaging service client that includes identity information specifying the respective messaging service client and the topic destination.

In a further embodiment, the invention is directed to a system including a messaging service provider that uniquely maps destination aliases both to corresponding messaging service clients and to destinations to which a client subscribes or publishes.

In an additional embodiment, the invention is directed to messaging service including a directory service that generates destination aliases that provide information about the client and the destination, the directory service comprising a directory of message destinations, and a number of topic factories, each of which communicates with the messaging service provider, which maintains mappings of destination aliases to client identifications and destinations.

In a further embodiment, the invention is directed to a computer-readable medium containing instructions. The instructions cause a programmable processor to maintain a mapping of destination aliases to topic destinations of a messaging service, wherein each destination alias is uniquely associated with a messaging service client. The instructions also cause the processor to select a first destination alias from the destination aliases in response to a network attack, and discard messages from the client associated with the selected destination.

In a further embodiment, the invention is directed to a computer-readable medium including instructions for causing a programmable processor to receive a request from a messaging service client to access a topic destination, access a collection of data to determine whether the client has previously been associated with a network attack, and assign the client a unique destination alias for accessing the topic destination based on the determination.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 illustrates an example data structure that maintains a mapping of destination aliases to respective topics.

DETAILED DESCRIPTION

Figure 1:
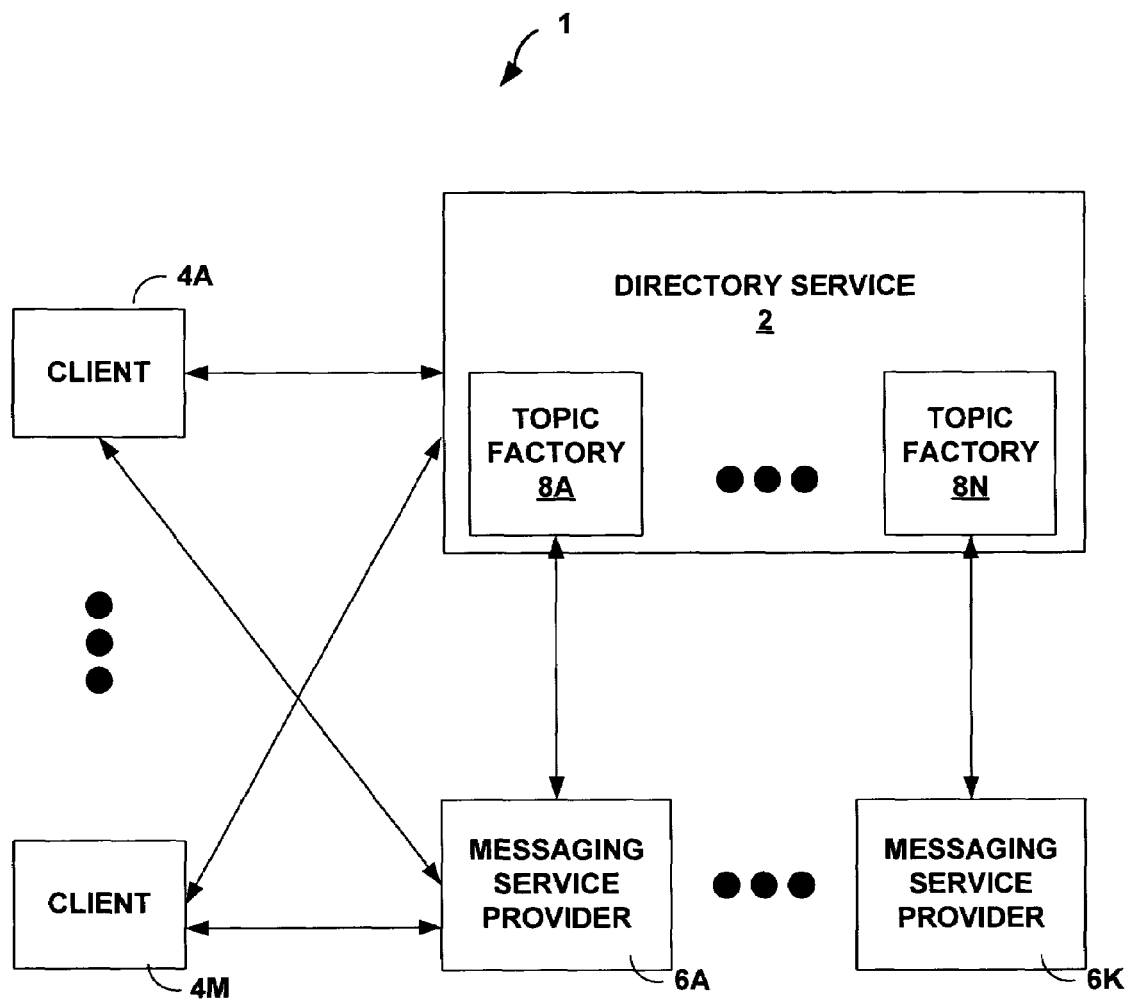
FIG. 1 is a block diagram illustrating an example system that utilizes destination aliases to minimize the effects of network attacks on a messaging service.

FIG. 1 is a block diagram illustrating an example system 1 that utilizes destination aliases to minimize the effects of network attacks on a messaging service. For exemplary purposes, system 1 will be described in reference to the Java Messaging Service (JMS), which is a widely used publish/subscribe messaging service specification. The invention, however, is not limited to JMS. The invention is directed to protecting messaging services, such as publish/subscribe systems and queuing systems from harmful network events. In particular, the invention helps to prevent Denial of Service (DoS) attacks by using "destination aliases" within one of messaging service providers 6A-6K (collectively "providers 6").

Example system 1 shown in FIG. 1 comprises a directory service 2, one or more clients 4A-4M (collectively "clients 4"), and one or more messaging service providers 6A-6K (collectively "messaging service providers 6"). As illustrated in FIG. 1, each of messaging service providers 6 registers with directory service 2, and installs a corresponding topic factory 8 within the directory service. Consequently, directory service 2 includes a number of topic factories 4A-4N (collectively "topic factories 4").

Each of messaging service providers 6 maintains information that relates to a number of "topics." For example, messaging service provider 6A may store information published by one or more of clients 4. For publish/subscribe messaging services, messaging service provider 6A may send the published message to any clients that are subscribed to the published topic. For queuing messaging services, a "published" message may be written to respective queues within messaging service provider 6A for one or more of clients 4. Messaging service provider 6A distributes the message to the respective client associated with the queues.

To publish or subscribe to a topic, client 4A requests a connection to a message service provider and a desired topic from directory service 2, which may be granted if the client 4A is in good standing. Upon receiving the request from client 4A, directory service 2 invokes an appropriate one of topic factories 8 that corresponds to one of the messaging service providers 6 that services the requested topic. For example, directory service 2 may invoke topic factory 8A upon receiving a request for a topic maintained by messaging service provider 6A.

To enable applications to survive despite an attack via the messaging service, directory service 2 may assign "destination aliases" to clients 4 when providing topics to the clients. In particular, topic factories 8 generate destination aliases when invoked by directory service 2 to register clients 4. In one embodiment, topic factory 8A may be responsible for generating a "destination alias" for a client requesting a topic. Each destination alias uniquely identifies a network source, i.e., a requesting one of clients 4, and a topic destination, i.e., one maintained by messaging service providers 6. For a JMS implementation, the source of the topic request includes the client identification, and the destination describes the topic that is being requested. In queuing messaging services, the destination alias may identify a particular queue as the destination, rather than a topic.

Topic factories 4 report new destination aliases to the corresponding messaging service providers 6. For example, when a destination alias is generated by directory service 2, the client 4 associated with the alias utilizes the destination alias to publish or subscribe to a particular topic maintained by the corresponding messaging service provider 6. Messaging service providers 6 maintain mappings that associate client identification with corresponding destination aliases and topics. The mapping within messaging service provider 6 may be updated to reflect new associations between clients, destination aliases, and destinations (topics for publisher/subscribe messaging services and queues for queuing messaging services).

After a destination alias is assigned, client 4A communicates directly with messaging service provider 6A in accordance with the messaging service without further access to directory service 2. Messaging service provider 6 may monitor the traffic associated with client 4 in order to detect an attack initiated by client 4. A device, such as messaging service provider 6, may detect a network attack based on network traffic, wherein a traffic parameter exceeding a threshold indicates a network attack may be occurring. In one embodiment the traffic parameter may be one of message volume to a destination, message rate to a destination, message volume to a destination alias, and message rate to a destination alias.

If it is determined that an attack is not occurring, communication with client 4 will continue. However, if it is determined that an attack is occurring, the targeted one of messaging service providers 6 may automatically drop messages associated with the potentially attacked destination alias.

Furthermore, in the event that a network attack is occurring, directory service 2 may receive information to prevent attacking client 4 from receiving a new destination alias. For example, directory service 2 may receive information, e.g., a client identity, specifying one or more of clients 4 as sources of network attacks. In response, directory service rejects any future requests for topic connections from the identified clients 4. Specifically, directory service 2 rejects the requests, and does not generate new destination aliases for the identified clients 4.

In addition, upon detecting an attack, messaging service provider 6 may inform other servers, such as messaging service providers 6 and directory services 2, that client 4 attempted to attack a messaging service. By informing other servers shortly after the attack occurred, the chance that the attacking client may receive a destination alias from a neighboring server is decreased.

Figure 2:
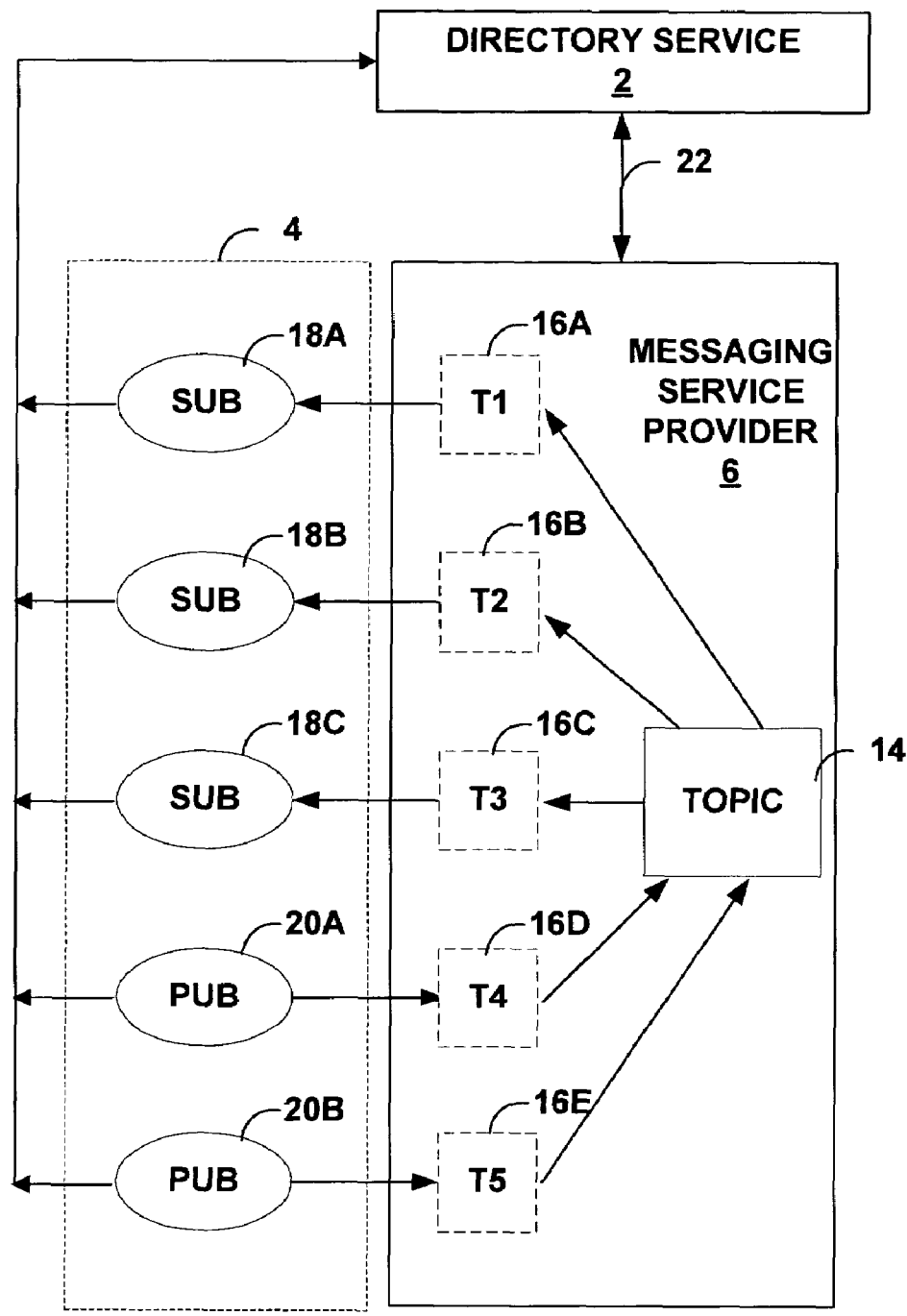
FIG. 2 is a block diagram illustrating an example messaging service provider.

FIG. 2 is a block diagram illustrating an example embodiment of a messaging service provider 6 in more detail. As illustrated, messaging service provider 6 includes a mapping of subscribing clients 18A, 18B, and 18C (collectively "subscribers 18") and publishing clients 20A and 20B (collectively "publishers 20") to corresponding destination aliases 16A, 16B, 16C, 16D, and 16E (collectively "aliases 16"). Each of destination aliases 16 uniquely maps a corresponding one of clients 4 to topic 14.

In the illustrated embodiment of FIG. 2, five clients 4 are depicted, and each client utilizes a respective destination alias 16 to access topic 14. In particular, subscribers 18 read from topic 14 and publishers 20 write to topic 14.

When requesting a destination, a client receives a generated destination alias for the destination instead of the destination itself. Notice that destination aliases 16 may include information about the source, i.e., the client sending or receiving information, and the destination, i.e., topic 14. Messaging service provider 6 maintains a mapping between destinations and aliases, which aids in reliable delivery of messages published to topic 14. Messages published to one of destination aliases 16 are reliably published to topic 14 and reliably delivered to other destination aliases 16 for the same topic 14. Although the use of destination aliases 16 is invisible to clients 4, it provides a way to distinguish between messages from different clients to the same destination. This feature aids in assessing and surviving flooding attacks.

Messaging service provider 6 can measure not only overall message rates and volumes to a given destination, but rates and volumes of messages to each destination alias in order to assess whether messaging service provider 6 is the focus of a network attack. Heavy traffic to one or more aliases, for example, may indicate an attack focused on those aliases. In this manner, destination aliases may strengthen an arsenal of network attack detection techniques maintained by network devices.

In response to detection of a network attack, messaging service provider 6 may drop messages sent to a destination alias. In one embodiment, messaging service provider 6 may make the destination alias corresponding to an attacking client invalid, thereby dropping messages sent to the destination alias. In addition, messaging service provider 6 may alert the client attempting to send the message that the destination is invalid. In a JMS system, for example, a client who attempts to send a message to an invalid destination receives a JMS Invalid Destination exception from the messaging service provider 6 indicating that the message was dropped. In other embodiments, messaging service provider 6 may not notify the sending client that the message to the destination alias has been dropped. By invalidating the destination alias or otherwise dropping messages to it, the messaging service provider 6 can continue to deliver messages from innocent clients and the application can continue to run.

After messaging service provider 6 has stopped traffic to an offending destination alias, the attacker may attempt to receive another destination alias and resume the network attack using the newly acquired destination alias. In order to prevent the attacker from receiving another destination alias, target service provider 6 may maintain information regarding the identity of the attacking client and alert topic factory 8 of the identity of the client in order to reject the attacker from acquiring additional destination aliases. For example, a JMS messaging service provider that uses a Java Naming and Directory Interface (JNDI) service to provide destination aliases to clients may be configured to provide the identity and credentials of the attacking client to the JNDI service. The JNDI Service may create a topic or alias by using a topic factory supplied by the JMS service provider. The topic factory can refuse to provide the client with additional destination aliases based on client identity information from the JMS messaging service provider.

FIG. 3 is an example data structure 24 maintained by a topic server provider, e.g., one of messaging service providers 6 of FIG. 1. As illustrated in the example of FIG. 3, data structure 24 maps destination aliases to a number of destinations. For purposes of example, data structure 24 is illustrated as a data structure for a publish/subscribe messaging service. In other words, data structure 24 maps destination aliases to a number of topics, i.e., topic T, topic A, and topic C.

Data structure 24 includes a client identity field 26 that contains identification information from a list of clients that communicate with messaging service providers 6 of system 1. Client identity field 26 may include identification information that distinguishes clients from one another, such as username and password, a digital signature, digital certificate, or other digital credential. Client identity field 26 may be useful in detecting sources of network attacks, defending against network attacks via dropping of messages associated with the client identity, and preventing future network attacks by rejecting requests for destination aliases from clients associated with the client identities.

If an attack is detected, for example, the respective messaging service provider 6 may note the identity of the aberrant client. When the client requests a new topic, the topic factory checks the client status and refuses access to the topic. Directory service 2 or messaging service provider 6 may reject further service to the client associated with the attack because the client's identity was received from the messaging service provider 6.

Additionally, a directory service that is aware of the attack associated with a client identity may refuse to generate a new destination alias to the client. More specifically, a messaging service provider or a directory service may invoke a topic factory that checks the client identity of a client requesting service to see if the client has been involved in an attack. A client with a history including an attack may be rejected service from the messaging service.

In some cases, there may be more than one destination alias associated with an attack. In addition, there may be more than one client causing the network attacks. In these cases, a directory service or a messaging service provider may remember the client identities of all clients involved in an attack. A future destination alias request by one of these client identities may be rejected.

A destination alias field 28 of data structure 24 contains destination aliases that include information about both the client identity and the destination, or topic, of a message. For example, box 32 illustrates a destination alias T1 that includes information about client 1 and topic T. A destination alias may take many different forms. To be consistent with the principles of the invention, a destination alias must simply include information that is sufficient to identify the source, or client identity, and destination of a message request.

A topic field 30 of data structure 24 includes the topic, or destination, that corresponds with the destination alias assigned to a client.

The mapping methodology illustrated in FIG. 3 may exist anywhere within the messaging service 1 of the invention. For example, the mapping may be maintained and stored within one of messaging service providers 6, one of topic factories 8, or elsewhere within directory service 2, or may be maintained by a combination of the messaging service and the directory service.

Figure 4:
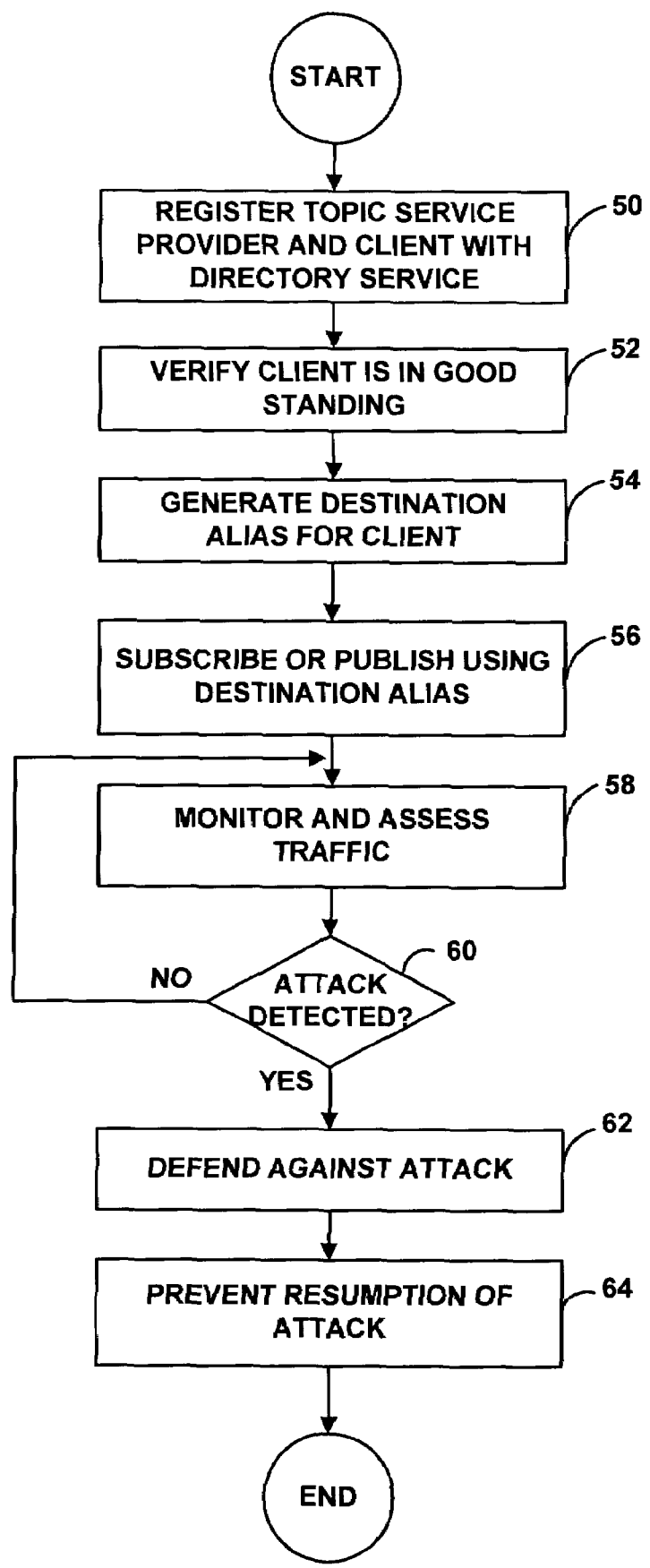
FIG. 4 is a flow diagram illustrating an example implementation of aliasing in a publish/subscribe messaging service.

FIG. 4 is a flow diagram illustrating an example mode of operation for the message service system of FIG. 1. Initially, one messaging service provider 6 and one or more clients 4 may be registered with a directory service 2 (50). Messaging service provider 6 registers with directory service 2 and gives the directory service 2 a way for clients to connect to the service provider and a topic factory that can make topics for the messaging service provider. The directory service 2 may enable clients to establish connections to the messaging service provider 6 and obtain topics managed by the service provider 6.

Client 4 may register with directory device 2 by requesting access to a topic. Directory service 2 may query client 4 to determine whether the client identity associated with the client has been involved in any network attacks in the past. Depending on the past behavior of client 4, directory service 2 may verify that client 4 is in good standing, i.e., has not been involved in any previous network attacks (52). For instance, if client 4 was involved in a previous attack, directory service 2 may reject the destination alias request. In one embodiment, a client further presents its client identity information to a messaging service and receives a topic.

Directory service 2 generates a destination alias for client 4 when client 4 is in good standing (54). The destination alias may be based on the destination, i.e., the topic being requested, and the source of a topic request, i.e., the client associated with the topic access request (54).

With the destination alias, client 4 may directly interact with messaging service provider 6 to send (publish) or receive (subscribe) messages (56). In a publish/subscribe messaging service, client 4 may publish to topic T as illustrated in FIG. 2. All clients that are subscribed to topic T may receive a copy of the published message. Meanwhile, a monitoring device may monitor and assess the traffic of the messaging service provider associated with the particular topic (58). The monitoring device may, for example, assess the message volume and rate to destinations and destination aliases. If the traffic flow of messages is above a threshold, the monitoring device may decide that an attack is occurring. Other alternative attack detection techniques may be used with the invention.

If the existing attack monitoring system does not detect an attack, the messaging service will continue to send and receive messages (60). However, if an attack is detected, the principles of the invention are used to defend the messaging service from the attack (62). More specifically, messaging service provider 6 may determine the destination alias that is the target of the attack and drop messages associated with the destination alias, thereby preventing malicious messages from reaching and interfering with the target application.

In addition to defending a messaging application from an attack, the invention may prevent resumption of the attack (64). As described above, messaging service provider 6 may notify directory service 2 of the client identity associated with the attack. In response, directory service 2 may deny further destination aliases to the client identity associated with the attack. Furthermore, directory service 2 or messaging service provider 6 may notify other servers that they should not generate destination aliases for the client responsible for the attack.

Various embodiments of the invention have been described. Although the message service system is described as having a single directory service, in some embodiments more than one directory service may be used to provide destination aliases. For example, it is possible to have a plurality of directory services and a corresponding set of messaging service providers to which clients may publish or subscribe. In addition, a single messaging service provider may comprise a plurality of cooperating servers, which may be distributed to different locations. Although the description focuses on publish/subscribe messaging services, such as JMS messaging services, the techniques of the invention relate to all types of messaging services, including message queuing systems. These and other embodiments are within the scope of the following claims.

The invention claimed is:

1. A method comprising:
   maintaining a mapping of destination aliases to topic destinations of a messaging service, wherein each destination alias is uniquely associated with a messaging service client;
   receiving aliasing information from a directory service that specifies a new messaging alias and associated messaging service client;

updating the mapping based on the received aliasing information;
selecting one of the destination aliases in response to a network attack; and
discarding messages associated with the identified destination alias.

2. The method of claim 1, further comprising:
receiving aliasing information from a topic factory that specifies a new messaging alias and associated messaging service client; and
updating the mapping based on the received aliasing information.

3. The method of claim 1, wherein maintaining a mapping comprises storing the mapping at a messaging server.

4. The method of claim 1, further comprising:
receiving a request at a messaging service from a new messaging service client to access a topic destination;
assigning the new messaging service client a unique destination alias for accessing the topic destination;
communicating aliasing information to the message server that identifies the new messaging service client and the assigned destination alias; and
updating the mapping at the message server based on the aliasing information.

5. The method of claim 1, wherein the messaging service comprises a publish/subscribe messaging service.

6. The method of claim 1, wherein the messaging service is a queuing messaging service.

7. A method comprising:
maintaining a mapping of destination aliases to topic destinations of a messaging service, wherein each destination alias is uniquely associated with a messaging service client;
selecting one of the destination aliases in response to a network attack;
discarding messages associated with the identified destination alias; and
preventing the client associated with the selected destination alias from receiving a subsequent destination alias based on client identification.

8. The method of claim 7, wherein selecting a destination alias from the destination aliases in response to a network attack comprises:
monitoring a parameter associated with the client; and
determining a network event is occurring based on the relationship of the parameter and a threshold.

9. The method of claim 8, wherein the parameter is one of message volume to destination, message rate to destination, message volume to destination alias, and message rate to destination alias.

10. A method comprising:
maintaining a mapping of destination aliases to topic destinations of a messaging service, wherein each destination alias is uniquely associated with a messaging service client;
selecting one of the destination aliases in response to a network attack;
discarding messages associated with the identified destination alias; and
preventing future attacks from the client associated with the selected destination by communicating identification of the client associated with the selected destination alias to a server that was not the target of the network event.

11. A method comprising:
communicating information from a first server to a second server, wherein the information describes a set of topics that are serviced by the first server as a messaging service;
maintaining a mapping of destination aliases to the topics of the messaging service,
wherein each destination alias is uniquely associated with a messaging service client;
selecting one of the destination aliases in response to a network attack; and
discarding messages associated with the identified destination alias.

12. The method of claim 11, wherein the first server comprises a messaging service provider and the second server comprises a directory service.

13. A method comprising:
receiving a request from a messaging service client to access a topic destination;
accessing a collection of data to determine whether the messaging service client has previously been associated with a network attack; and
assigning the messaging service client a unique destination alias for accessing the topic destination based on the determination.

14. The method of claim 13, wherein the destination alias includes information identifying the messaging service client and the topic destination.

15. A system comprising:
a directory service that provides an operating environment for a topic factory corresponding to a messaging service, wherein in response to a request from a messaging service client the topic factory generates a corresponding destination alias for the messaging service client that includes identity information specifying the respective messaging service client and a topic destination of the messaging service; and
a server, wherein the server accesses a collection of data to determine whether the client has previously been associated with a network attack, and assigns the client a unique destination alias for accessing the topic destination based on the determination.

16. The system of claim 15, wherein the messaging service comprises a publish/subscribe messaging service.

17. A system comprising a directory service that provides an operating environment for a topic factory corresponding to a messaging service, wherein in response to a request from a messaging service client the topic factory generates a corresponding destination alias for the messaging service client that includes identity information specifying the respective messaging service client and a topic destination of the messaging service, and further wherein the directory service prevents future attacks from the client by communicating the client identification of the client to a server other than the server that was the target of the network event.

18. A system comprising:
a messaging service provider that uniquely maps destination aliases both to corresponding messaging service clients and destinations that the messaging service uses to route messages from publishers to subscribers, wherein each destination alias includes information that describes a corresponding one of the messaging service clients and a corresponding one of destinations to which the messaging service client subscribes or publishes; and
a server, wherein the server accesses a collection of data to determine whether the client has previously been associated with a network attack, and assigns the client a unique destination alias for accessing the topic destination based on the determination.

19. The system of claim 18, further comprising a monitoring unit executed by the messaging service provider that monitors a traffic parameter characterizing the traffic between the client and the messaging service provider.

20. The system of claim 19, wherein the traffic parameter is one of message volume to destination, message rate to destination, message volume to destination alias, and message rate to destination alias.

21. The system of claim 18, wherein the messaging service provider prevents future attacks from the client by communicating the client identification of the client to a server other than the server that was the target of the network attack.

22. The system of claim 18, wherein the messaging service comprises a publish/subscribe messaging service.

23. A messaging service comprising:
    a messaging service provider for maintaining mapping of identifications for messaging service clients to destination aliases; and
    a directory service comprising a directory of the topic destinations of the messaging service provider, wherein the directory service generates each of the destination aliases to identify one of the messaging service clients and one of the topic destinations,
    wherein the messaging service provider communicates information to the directory service that describes a set of topics that are serviced by the messaging service provider, and
    wherein the messaging service provider selects one of the destination aliases in response to a network attack and discards messages associated with the identified destination alias.

24. The messaging service of claim 23, wherein the messaging service comprises a publish/subscribe messaging service.

25. A computer-readable storage medium comprising instructions for causing a programmable processor to:
    maintain a mapping of destination aliases to topic destinations of a messaging service, wherein each destination alias is uniquely associated with a messaging service client;
    receive aliasing information from a directory service that specifies a new messaging service client and associated network alias;
    update the mapping based on the received aliasing information;
    select a destination alias from the destination aliases in response to a network attack; and
    discard messages from the client associated with the selected destination.

26. The computer-readable storage medium of claim 25, wherein the instructions cause the processor to:
    receive a request at a directory service from a new messaging service client to access a topic destination;
    assign the new messaging service client a unique destination alias for accessing the topic destination;
    communicate aliasing information to the topic server that identifies the new messaging service client and the assigned destination alias; and
    update the mapping at the topic server based on the aliasing information.

27. A computer-readable storage medium comprising instructions for causing a programmable processor to:

maintain a mapping of destination aliases to topic destinations of a messaging service, wherein each destination alias is uniquely associated with a messaging service client;
select a destination alias from the destination aliases in response to a network attack;
discard messages from the client associated with the selected destination; and
prevent the client associated with the selected destination from receiving a second destination alias based on client identification.

28. The computer-readable storage medium of claim 27, selecting a destination alias from the destination aliases in response to a network attack comprises:
    monitoring a parameter associated with the client; and
    determining a network event is occurring based on the relationship of the parameter and a threshold.

29. The computer-readable storage medium of claim 28, wherein the parameter is one of message volume to destination, message rate to destination, message volume to destination alias, and message rate to destination alias.

30. A computer-readable storage medium comprising instructions for causing a programmable processor to:
    maintain a mapping of destination aliases to topic destinations of a messaging service, wherein each destination alias is uniquely associated with a messaging service client;
    select a destination alias from the destination aliases in response to a network attack;
    discard messages from the client associated with the selected destination; and
    prevent future attacks from the client associated with the selected destination by communicating the client identification of the client associated with the selected destination to a server that was not the target of the network event.

31. A computer-readable storage medium comprising instructions for causing a programmable processor to:
    communicate information from a first server to a second server, wherein the information describes a set of topics that are serviced by the first server;
    maintain a mapping of destination aliases to topic destinations of a messaging service, wherein each destination alias is uniquely associated with a messaging service client;
    select a destination alias from the destination aliases in response to a network attack; and
    discard messages from the client associated with the selected destination.

32. The computer-readable storage medium of claim 31, wherein the first server comprises a messaging service provider and the second server comprises a directory service.

33. The computer-readable storage medium of claim 31, wherein the instructions cause the processor to register the client with the second server, wherein registering a client with the second server comprises:
    communicating the client a connection factory, which enables the client to establish a connection with the second server; and
    running the connection factory, which establishes a connection between the client and the second server.

34. The computer-readable storage medium of claim 31, wherein the messaging service is a publish/subscribe messaging service.

35. The computer-readable storage medium of claim 31, wherein the messaging service comprises a queuing messaging service.

36. A computer-readable storage medium comprising instructions for causing a programmable processor to:

receive a request from a messaging service client to access a topic destination;

access a collection of data to determine whether the client has previously been associated with a network attack; and assign the client a unique destination alias for accessing the topic destination based on the determination.

37. The computer-readable storage medium of claim 36, wherein the destination alias includes information about the messaging service client and the topic destination.

* * * * *